Aug. 20, 1929.  H. A. KEINER  1,725,521
COOKING DEVICE
Filed Jan. 30, 1928  2 Sheets-Sheet 1
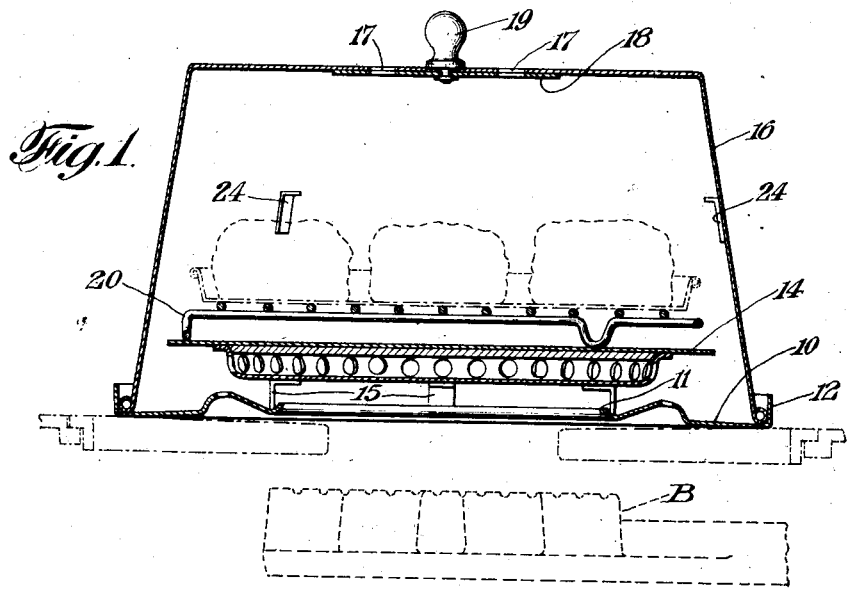
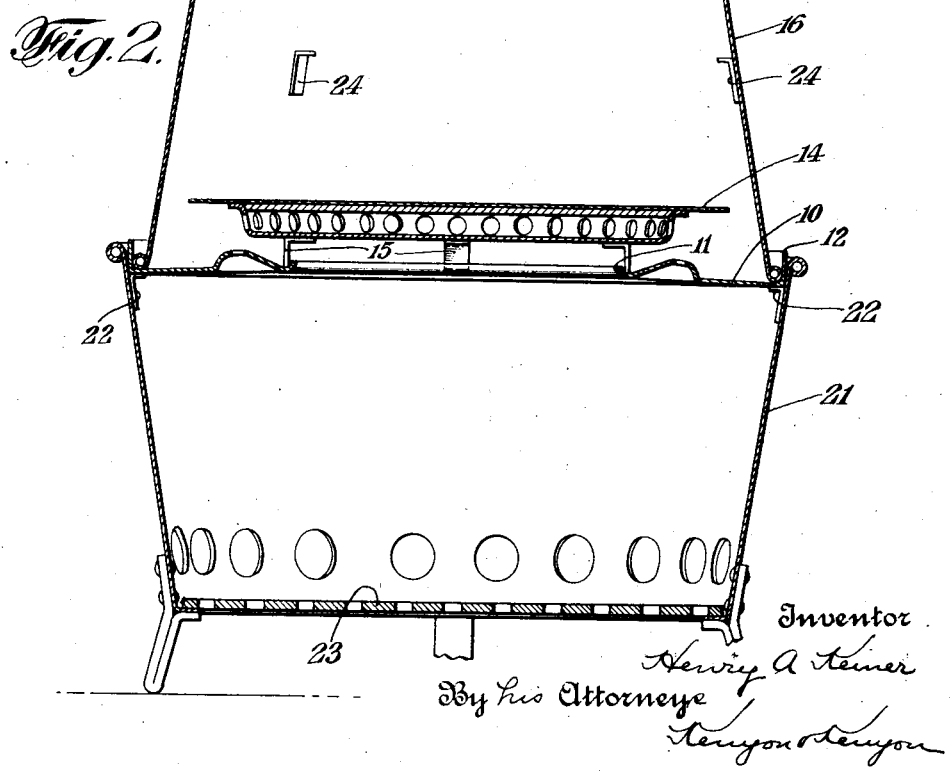

Aug. 20, 1929.  H. A. KEINER  1,725,521
COOKING DEVICE
Filed Jan. 30, 1928  2 Sheets-Sheet 2

Inventor
Henry A. Keiner
By his Attorneys
Kenyon & Kenyon

Patented Aug. 20, 1929.

1,725,521

UNITED STATES PATENT OFFICE.

HENRY A. KEINER, OF KEW GARDENS, NEW YORK.

COOKING DEVICE.

Application filed January 30, 1928. Serial No. 250,451.

This invention relates to cooking devices and has for an object to provide a new and improved device which may be used either in connection with electric, gas, oil or gasoline stoves or may be used by camps, etc., as an outdoor stove.

In its preferred form, the device comprises an annular plate having its inner and outer edges upturned and having a frusto conical cover, the rim of which fits within the upturned edge of the plate, the two members combining to form an oven. The annular plate is arranged upon the gas or oil stove with its aperture directly above the burner. A heat spreader is supported above the aperture in the annular member and serves as a support for a baking pan or the like. When used as a camper's oven, the annular plate forms the lid of a stove having an inverted frusto conical body, the bottom of which is perforated to constitute a grid. A grill is also provided which may be arranged upon the spreader if desired. The device may be used as an oven for baking or as a roaster, and, if desired, the cover and spreader may be removed and the device used in other forms of cooking.

The design and dimensions of the various parts are such that the parts may be nested in compact form. The bottom of the stove body is removable, and, when it is removed, the cover, upon being inverted, fits into the stove body. The spreader fits into the inverted cover and is supported therein by lugs provided on the wall of the cover. The grill and the perforated bottom also fit into the cover and are supported by the spreader. The annular plate when inverted fits into the top of the stove body and forms a cover therefor.

Other objects, novel features and advantages of this invention will be apparent from the following specification and accompanying drawings, wherein Figure 1 is a vertical section through an embodiment of the invention used in connection with a gas stove;

Fig. 2 is a sectional view of an embodiment of the invention as used with the camping stove;

Figure 3:
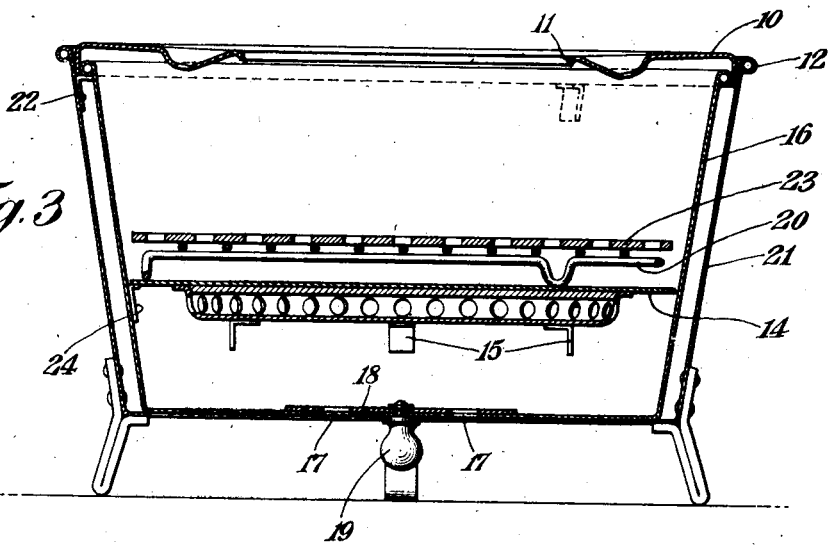
Fig. 3 is a sectional view showing the various parts in nested position.

10 designates an annular plate having upturned inner and outer edges 11 and 12 respectively, the height of the edge 12 being slightly greater than that of 11. The plate slopes upwardly toward the inner edge 11 so that any liquid therein tends to run toward the outer edge. The plate is also provided with upwardly extending apertured projections arranged between the inner and outer edges 11.

A spreader 14 is supported above the aperture through the plate 10 by means of legs 15 which rest upon the plate 10 adjacent the edge 11. The legs not only support the spreader 14 but by contact with the edge 11 serve to position it directly over the aperture. A frusto conical cover 16 is provided, the lower edge of which rests upon the plate 10 and bears against the flange 12. Vents 17 are provided in the top of the cover, which vents may be closed by the disc 18 rotatable by the handle 19. A grill 20 is provided which may rest upon the spreader 14 and upon which a baking tin or the like may be supported.

In Fig. 1, the plate 10 is disclosed as being supported by the framework of a gas stove with its aperture directly over the burner B. Heat from the burner passes up through the aperture and also through the apertures in the projections 13 and is distributed throughout the oven by means of the spreader 14. If during use, any liquid escapes over the edge of the cooking utensil, it is caught by the plate 10 and prevented from dripping on to the burner B. Accidental extinguishment of the gas flame is thus prevented, as well as the flaring which sometimes takes place when fluid drops on to the burner of a gasoline or oil stove. When it is desired to boil vegetables or the like, the cover may be removed and the cooking utensil or the like be placed directly on the plate itself. In such case, the design of the plate is particularly useful in catching liquid boiling over from the utensil and preventing its coming in contact with the burner.

As shown in Fig. 2, the plate 10 may constitute the lid of a stove having an inverted frusto conical body 21. The plate is supported by brackets 22 arranged adjacent the top of the body 21. A perforated bottom plate 23 serves as the grid of the stove and is made removable. A charge of charcoal or the like may be introduced into the stove body 21 and a single charge will last for a sufficient time to bake pastry or vegetables. If meat is being roasted, it may be necessary to give the stove an additional charge of charcoal. In any event, the device provides a stove which may be set up anywhere out of doors and used for a camper's cooking outfit.

Figure 4:
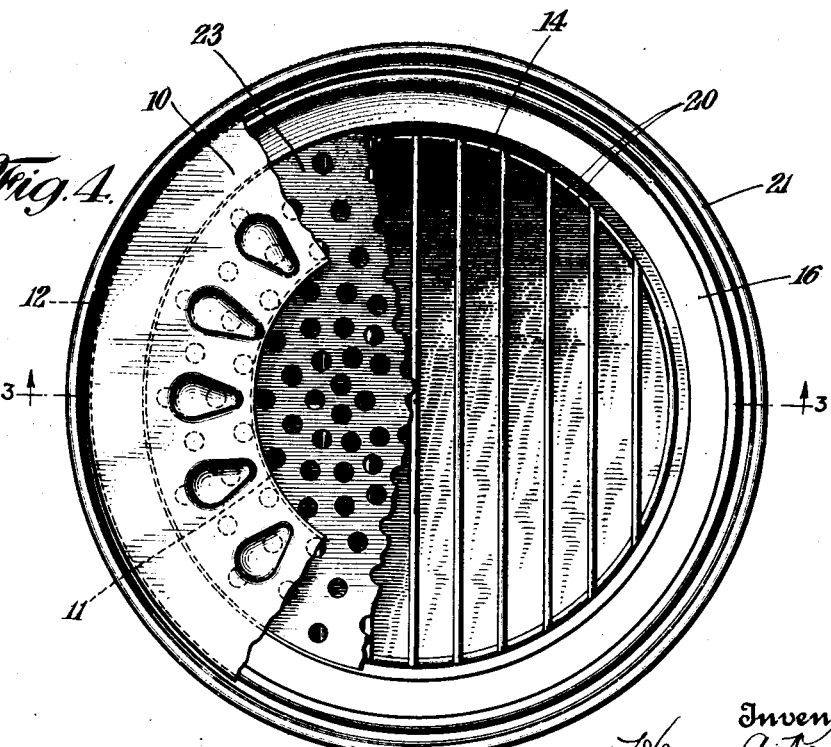
Fig. 4 is a plan view partially broken away of the nested parts.

As shown in Figs. 3 and 4, the cover 16 is of slightly smaller dimensions than the body 21, and, when the perforated bottom 23 is removed and the cover 16 inverted, the latter fits into the body. The spreader 14 is of such dimensions as to fit down into the cover 16 and rest upon brackets 24 provided for that purpose. The grill 20 and the stove bottom 23 are of the proper dimensions to fit down in the cover 16 and be supported by the spreader 14. The annular plate 10 when inverted fits into the top of the body 21 with its outer edge 12 resting upon the brackets 22. When the parts are thus nested, they form a compact device which takes up but little space and which may readily be transported on the running board of an automobile or stowed away with other camping equipment.

Although the plate 10 is specifically disclosed as being circular and provided with but a single aperture it is to be understood that this plate may be of different shape and may have more than one aperture so that it may be used in connection with more than one burner of a stove. The other parts of the device, of course, may be varied to correspond to the plate 10. Moreover, other structural changes may be made without in any way departing from the spirit of the invention as defined in the appended claims.

I claim:

1. A device of the character described comprising an annular plate having upturned inner and outer edges, a spreader overlying the inner edge of said annular plate, means for supporting the spreader from the plate in spaced relationship, a cover having its bottom resting on said plate adjacent said outer edge, an inverted frusto conical stove body having its upper edge surrounding said plate, and means for supporting said plate.

2. A device of the character described comprising an annular plate having upturned inner and outer edges, a spreader overlying the inner edge of said annular plate, means for supporting the spreader from the plate in spaced relationship, an inverted frusto conical stove body having its upper edge surrounding said plate, means for supporting said plate, and a removable perforated plate forming the bottom of said stove body.

3. A device of the character described comprising an annular plate having upturned inner and outer edges, a spreader overlying the inner edge of said annular plate, means for supporting the spreader from the plate in spaced relationship, a cover having its bottom resting on said plate adjacent said outer edge, an inverted frusto conical stove body having its upper edge surrounding said plate, means for supporting said plate, and a removable perforated plate forming the bottom of said stove body.

4. A device of the character described comprising an annular plate having upturned inner and outer edges, a spreader overlying the inner edge of said annular plate, means for supporting the spreader from the plate in spaced relationship, an inverted frusto conical stove body having its upper edge surrounding said plate, means for supporting said plate, a removable perforated plate forming the bottom of said stove body, said stove body being of proper dimensions to receive said cover when inverted and the cover to receive and support said spreader and removable perforated plate.

5. A device of the character described comprising an annular plate having upturned inner and outer edges, a spreader overlying the inner edge of said annular plate, means for supporting the spreader from the plate in spaced relationship, a cover having its bottom resting on said plate adjacent said outer edge, an inverted frusto conical stove body having its upper edge surrounding said plate, means for supporting said plate, and a removable perforated plate forming the bottom of said stove body, said stove body being of proper dimensions to receive said cover when inverted and the cover to receive and support said spreader and removable perforated plate.

In testimony whereof, I have signed my name to this specification.

HENRY A. KEINER.